United States Patent [19]

Urbas

[11] Patent Number: 4,706,391
[45] Date of Patent: Nov. 17, 1987

[54] HEAT COLLECTOR FOR THE DRYER SECTION OF A PAPERMAKING MACHINE

[76] Inventor: John C. Urbas, Front Road, R.R. #2, Hawksbury, Ontario, Canada, K6A 2R2

[21] Appl. No.: 919,008

[22] Filed: Oct. 15, 1986

[51] Int. Cl.⁴ .............................................. F26B 13/08
[52] U.S. Cl. ........................................ 34/114; 34/116; 34/123
[58] Field of Search ..................... 34/114, 116, 123, 86

[56] References Cited
U.S. PATENT DOCUMENTS
4,103,434 8/1978 Walker .................................. 34/114

Primary Examiner—Larry I. Schwartz
Attorney, Agent, or Firm—Oblon, Fisher, Spivak, McClelland & Maier

[57] ABSTRACT

In a papermaking machine comprising a drying section wherein a hood covers a series of dryer drums supported by the frame, the dryer drums convey an endless felt supporting a continuous sheet of pulp to be dried. At least one heat collector is provided for collecting high quality heat generated and concentrated in the immediate vicinity of the dryer drums. The heat collector defines an enclosure having bases, sides and ends wherein one of the bases is constituted by a plurality of the dryer drums. The heat collector also contains an exhaust system to separately evacuate the high quality heat collected within the heat collector from the low quality heat collected by the hood covering the dryer drums. The heat collector is preferably constituted of fabric material and the heat separately evacuated therefrom is recycled elsewhere in the plant to supply or release additional energy.

13 Claims, 6 Drawing Figures

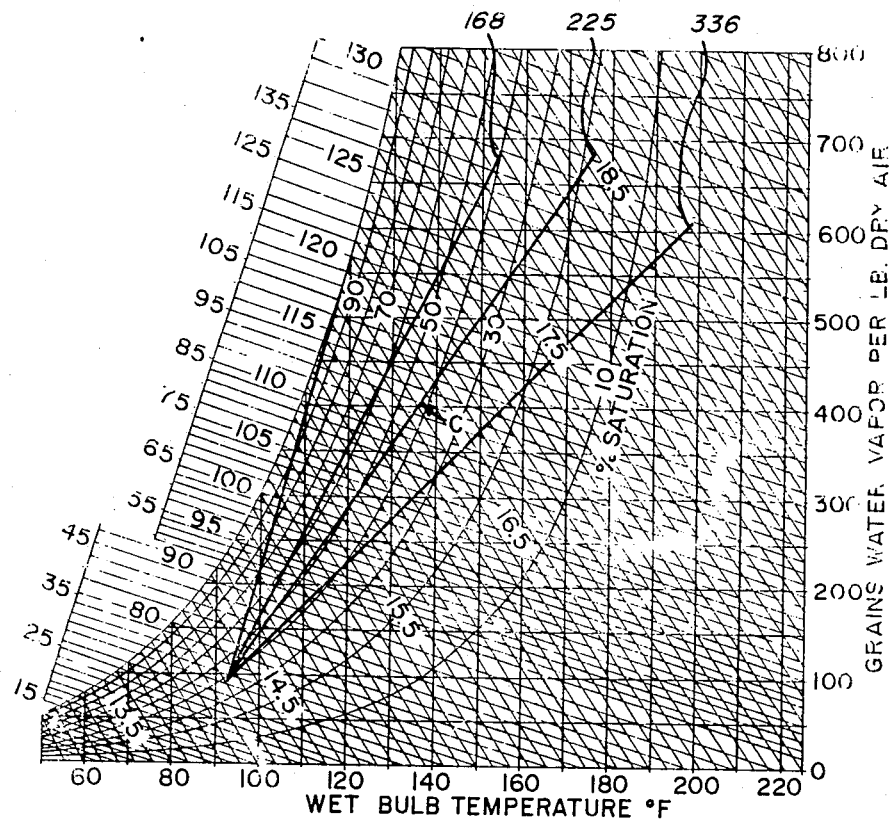
FIG. 2 PSYCHROMETRIC CHART
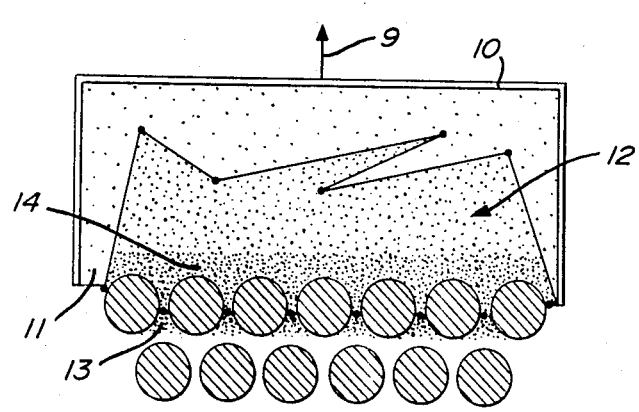
FIG. 3 TEMPERATURE CONDITIONS WITHIN THE HOOD AND DRYING ZONES

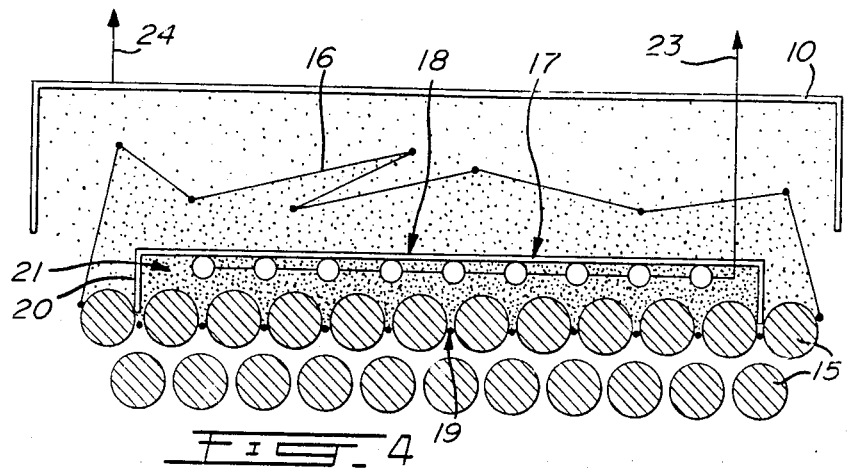
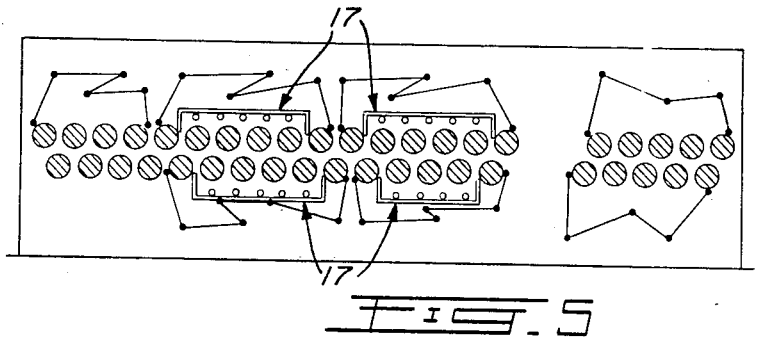
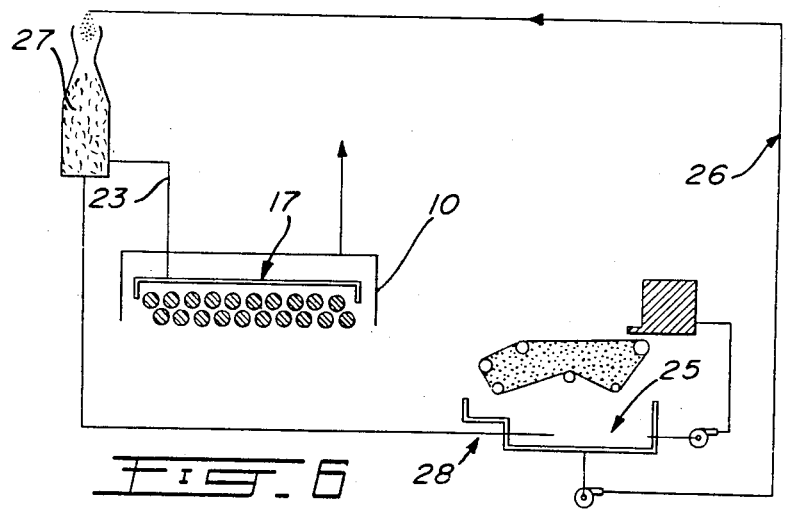

HEAT COLLECTOR FOR THE DRYER SECTION OF A PAPERMAKING MACHINE

BACKGROUND OF INVENTION

1. Field of Invention

The present invention relates to a device which will collect high quality heat vapors at the point of generation in order to increase the ability to reuse the available energy released by the dryer section of a papermaking machine and reduce the prime energy needs by other process users.

2. Description of Prior Art

It is well known that a papermaking plant is a high consumer of energy. For example, each ton of paper dried discharges heat equivalent to ¾ of a barrel of oil. In a typical one thousand ton per day mill, this converts to a sizeable oil well approaching thirty barrels per hour. In spite of this apparent abundance of energy waste, expensive prime heat continues to be used to satisfy such menial functions as heating water and heating air. It is then a necessity to work out an efficient system to adequately recuperate and properly recycle such waste energy.

The recuperation and recycling of heat is not new and all mills use the principle in varying degrees. Different attempts have been made to recuperate and recycle the heat lost in the dryer section of a paper machine. To that effect open hoods as well as closed hoods have been placed on top of the dryer drums of the drying section of a papermaking machine. All these have their drawbacks.

As an example, the present technology is such that exhaust humidities are limited to the order of one thousand grains per pound dry air. If exhaust humidity is raised beyond the one thousand grains, there is a very good chance that the hood will sweat, dripping water onto the sheet directly or on to the travelling felt which will transfer its moisture spots to the sheet when contact is made.

This humidity condition limits the quality of the waste heat recoverable to heat water to 135° F. Water at 135° F., though adequate for a variety of applications, cannot satisfy the energy demands of users beyond 135° F. and therefore limits the benefits of the recovery.

SUMMARY OF THE INVENTION

It is a feature of the present invention to provide a device for collecting a better quality heat at its point of generation.

It is another feature of the present invention to provide a source of heat which is up to three times more heat intensive per pound of dry air than conventional practice.

It is another feature of the present invention to eliminate approximately one third of present exhaust needs on a closed hood and nearly one half of open hood exhaust air.

It is another feature of the present invention to render possible the use of the concentrated heat generated as a means of heating wire pits and/or other process heater circuits.

It is a further feature of the present invention to provide a device that will not interfere with the frame and the operators when the need arises to spear the paper during a break.

According to the broad aspect of the present invention, there is provided an improved papermaking machine comprising a drying section wherein a hood covers a series of dryer drums supported by a frame. The dryer drums can also use an endless felt to support the continuous sheet of pulp to be dried. The improvement consists of at least one heat collector for collecting high quality heat generated and concentrated in the immediate vicinity of the dryer drums. The heat collector defines an enclosure having bases, sides and ends, wherein one of the bases is constituted by a plurality of the dryer drums and contains exhaust means to separtely evacuate the high quality heat collected within the heat collector from the low quality heat collected by the hood.

BRIEF DESCRIPTION OF DRAWINGS

A preferred embodiment of the present invention will now be described with reference to the examples thereof as illustrated by the accompanying drawings in which:

FIG. 2 illustrates the same psychrometric chart with line additions to assist in interpreting air temperature conditions;

FIG. 3 shows the different temperature conditions within the hood and drying zones of a papermaking machine;

FIG. 4 shows a heat collector of the present invention;

FIG. 5 shows the location of two or more heat collectors of the present invention in the drying section of a papermaking machine; and FIG. 6 shows a system wherein the high quality heat evacuated from the heat collector is used to heat the wire pits.

DESCRIPTION OF PREFERRED EMBODIMENTS

Figure 1:
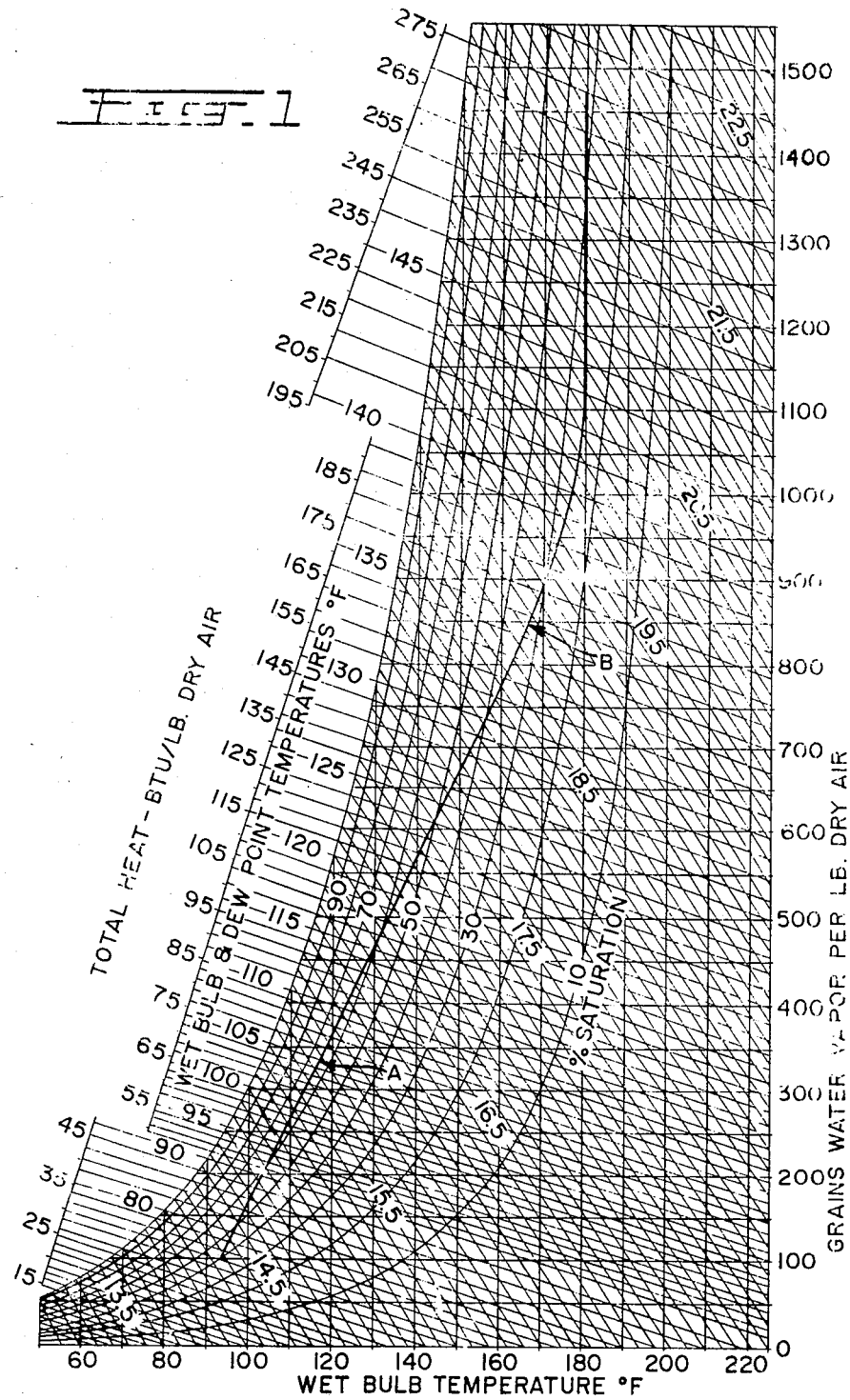
FIG. 1 illustrates a psychrometric chart depicting the quality of the heat leaving the drying section of a papermaking machine.

The heat release from dryers follows a very consistent pattern as shown by the (heavy) line on the psychrometric chart of FIG. 1. The air temperature increases by 10° F. for every 100 grains of pickup. This relationship was developed by monitoring exhaust conditions for some thirty years; little has changed in this pattern.

The exhaust temperature measurements are a good way to describe dryer activity and tell a lot about what is going on. Typical conditions for an open hood could be designated by "A" while closed hoods could go up to the point "B" where the air used is only ⅓ of that in "A". The heat content of the air is a composite of the air's initial heat, the water evaporated, plus the heat added to the air during its travel throughout the drying process. In going from "A" to "B", the heat pickup by the air is identical. At "A", a 250 grain pickup results in a heat gain of (76.6 minus 30) 46.6 btu in the carrying air. At "B", the pickup is 750 rains (170 minus 30) or 140 btu. In both cases, the heat gain is 18.64 btu per 100 grains pickup. The point made here is that there are no economies in the hood by reducing the exhaust air, at least not at these two levels. Line additions to the psychrometric chart (FIG. 2) can be made to assist in interpreting air temperature conditions. Any departure from the norm can be readily identified. For example, "C" has strayed from the line and its sensible heat has increased to 225 btu per pound rather than 166. This measurement is useful in diagnosing energy excesses and the most frequent cause for an excess, as shown in this example, is simply that the air being delivered to the machine is too hot.

The information on this chart also tells us other things; the most important being the "wet bulb". The wet bulb is an index of the quality of heat which can be expected during recovery. A 10° F. drop below the wet bulb is a good rule of thumb. In short, at 100° F., recovery at 90° F. is possible; at 150° F., it is 140° F. and so on. The advantages of high wet bulbs are obvious. A larger portion of the available waste is recoverable at higher temperatures. Unfortunately, there are limits to the levels to which wet bulbs can be raised, and in our industry, the limits are set up by the design of the hood. Closed hoods can tolerate 1,000 grain per pound of dry air, but beyond that, it becomes risky, since a new problem area is encountered, that of sweating.

Referring now to FIG. 3 which shows the different temperature conditions within the hood and drying zones wherein the air mixture exhausting from the hood (10) at (9) is a mixture or variety of different components like aisle air (11), air in felt run (12), air in pocket (13) and very concentrated air (14), it is evident that areas of high humidity exist near the paper, but these "rich" heat sources are diluted with air used for evacuation.

The temperatures referred to earlier and shown on the psychrometric chart (FIGS. 1 and 2) are all final air temperatures leaving the hood at point 9. They are really a mixture of the different components like aisle air (11) and pocket air (13), etc. Pocket air wet bulb temperatures in the 175° F. level are not uncommon and 165° F. is fairly prevalent. If this quality heat could be collected, the recovery strategies now used could be changed completely.

On the other hand, extreme caution must be taken to avoid disturbing production habits or introducing additional problems. The perfect spot would be inside the felt run when one exists and very near the paper when a felt run is absent. In the shadowed zone (12) some very high quality heat (14) is available. If it could be collected before spill out, the dilution process with which it is now plagued could be by-passed. The idea of concentrating the exhaust is not new since it was the principle which prompted the development of the closed hood. Unfortunately, the closed hood has its limits due to sweating and, if we are to reach the 150° to 160° F. water range the heat content available in the present closed hood must be doubled. Several methods have been tried, such as reversing the pocket ventilation nozzles, etc., but all failed to reach the expected target.

Our solution to these problems is to put an enclosure inside the enclosure or a device we call a "heat collector". A preferred embodiment of the present invention will now be described with reference to FIG. 4 which shows a drying section of a papermaking machine wherein a hood (10) having an exhaust (24) covers a series of dryer drums (15) supported by a frame (which has been eliminated for sake of clarity), frequently though not alsway conveying and endless felt (16) supporting a continuous sheet of pulp to be dried, and comprising a heat collector (17) defining an enclosure having bases (18, 19), sides (21), and ends (20) and containing exhaust means to separately evacuate in the (23) the high quality air collected in the immediate vicinity of the dryer drums. The exhaust means consists of ducts of material having a hollow cylindrical shape and fixed to the heat collector. Preferably, the heat collector is constituted of fabric material and the exhaust means consists of ducts tailored into the design of the fabric material.

This heat collector fits over the pulp dryers and inside the felt run, a felted dryer does not interfere with the operation, and permits the collection of more than half of the heat released by the dryers. The existing hood remains in place. There are now two exhaust streams; one from the heat collector (17) and one considerably reduced from the existing hood (10.)

More than one such heat collector could be used in the drying section of a papermaking machine, in which case, they would preferably be symmetrically located over the top row and the bottom row of dryer drums as illustrated in FIG. 5 wherein four such heat collectors (17) are so located.

This new high quality heat source provides the vehicle for efficient energy recycling to the various users, the most effective of which is that of heating the wire pit, white water silo, or other similar process areas. Since wire pit water balances are so critical, heat can only be added by steam or indirect heaters. With the heat collectors of the present invention, a direct heat exchanger can add as much heat as the user needs, and 10 to 20 million btu per hour is done quite easily. FIG. 6 depicts such a system wherein white water recovered from the wire pit (25) circulates to a conduit (26) to a heat recovery tower (27) to which heat collected by the heat collector (17) located under hood (10) is supplied through exhaust (23) to add additional heat to the white water which in turn returns to the wire pit through conduit (28).

There are several immediate side benefits to this arrangemetn in that drying energy costs drop because less sensible heat is used, and a saving of 68 btu per pound of water evaporated is automatic. The exhaust air at 180 and 1,500 grains drops the sensible heat from 168 to 100 btu per pound of water.

Hoods with chronic sweating problems will also benefit from this arrangement and open hood machines which worry about temperature stresses from closed hoods can pursue more efficient heat recovery since the high humidity air can be handled without danger of sweating and the operation can reap the benefits of reduced hood exhaust and high heat recovery, now available only with the closed hood approach.

Perhaps one of the most important features of the heat colelctor is its use in a news mill where, in conjunction with the white water system, a surcharge of energy can be added to the system for use elsewhere. For example, the white water system, because of its broad network, can be used as a convenient source of heating at plant extremities. The only requisite is that we put in enough energy to satisfy all users.

Still another attraction is the possibility of using the principle to release higher heat sources like groundwood water at 170° F. for such functions as drying air, heating, etc. Since the white water system averages a composite of several temperature levels, one can, by the over addition of low level heat, make a higher heat source available as a surplus for use elsewhere. By the over addition of heat collected in the heat collector to the white water system, the high temperature sources generated in the groundwood can be collected and used more efficiently. This acts like a step-up transformer where unusable low grade heat is upgraded to a higher and more acceptable level.

I claim:

1. in a papermaking machine comprising a drying section wherein a hood covers a series of dryer drums supported by a frame, said dryer drums supporting a continuous sheet of pulp to be dried, the improvement consisting of at least one heat collector disposed under said hood in close proximity to said dryer drums for collecting high quality, high temperature heat generated and concentrated in the immediate vicinity of said dryer drums; said heat collector defining an enclosure having base walls, side walls and ends wherein one of said base walls is constituted by a plurality of said dryer drums, and exhaust means in communication with said enclosure to evacuate the high quality heat collected within said heat collector from the low quality heat collected by said hood and transport same away from said drying section.

2. The heat collector of claim 1, wherein said continuous sheet is supported on an endless felt supported by said dryer drums.

3. The heat collector of claim 2, wherein said heat collector is supported by said frame and is located inside the felt run of said drying section.

4. The heat collector of claim 2, wherein said heat collector is constituted of fabric material.

5. The heat collector of claim 2, wherein said exhaust means consists of ducts fixed to said heat collector.

6. The heat collector of claim 5, wherein said ducts consist of a material having a hollow cylindrical shape.

7. The heat collector of claim 4, wherein said exhaust means consists of ducts tailored into the design of the material.

8. A papermaking machine comprising one or more heat collectors as claimed in claim 2.

9. A papermaking machine as claimed in claim 8, wherein the heat collectors are symmetrically located on the top row and the bottom row of said dryer drums.

10. A papermaking machine as claimed in claim 8, wherein the high quality heat separately evacuated through said exhaust means is recycled to heat a wire pit.

11. A papermaking machine as claimed in claim 8, wherein the high quality heat separately evacuated through said exhaust means is recycled through a white water system to supply heat at plant extremities.

12. A papermaking machine as claimed in claim 8, wherein the high quality heat separately evacuated through said exhaust means is recycled through the white water system to release higher heat sources.

13. A papermaking machine as claimed in claim 12, wherein said higher heat source is provided by groundwood water.

* * * * *